United States Patent
Hölzer et al.

[11] Patent Number: 6,164,338
[45] Date of Patent: Dec. 26, 2000

[54] CORRUGATED PIPE WITH FOOT

[75] Inventors: Willi Hölzer, Königsberg; Manfred Krauss, Würzburg; Tilo Neubauer, Königsberg; Carsten Pfister, Sennfeld, all of Germany

[73] Assignee: Frankische Rohrwerke Gebr. Kirchner GmbH & Co., Germany

[21] Appl. No.: 09/285,603

[22] Filed: Apr. 2, 1999

[30] Foreign Application Priority Data

Apr. 3, 1998 [DE] Germany .................... 198 15 137
Aug. 26, 1998 [DE] Germany .................... 198 38 793

[51] Int. Cl.[7] ............................................. F16L 3/00
[52] U.S. Cl. .................... 138/106; 138/121; 138/162; 138/166; 174/68.3; 174/92
[58] Field of Search ............................. 138/121, 122, 138/162, 166, 173, 106, 107; 174/138, 102 D, 102 R, 102 SP, 102 E, 63.8, 92

[56] References Cited

U.S. PATENT DOCUMENTS

| | | | |
|---|---|---|---|
| 1,270,579 | 6/1918 | Witzenmann | 138/122 |
| 3,861,153 | 1/1975 | Maroschak | 138/121 |
| 3,878,685 | 4/1975 | Schmunk | 138/121 |
| 3,897,090 | 7/1975 | Maroschak | 138/121 |
| 4,388,488 | 6/1983 | Wlcek et al. | 138/166 |
| 4,611,636 | 9/1986 | Kanao | 138/173 |
| 5,439,035 | 8/1995 | Dal Palu | 138/121 |
| 5,566,722 | 10/1996 | Bartholomew | 138/166 |
| 5,706,864 | 1/1998 | Pfleger | 138/121 |
| 5,792,532 | 8/1998 | Pfleger | 138/121 |
| 5,795,100 | 8/1998 | Thomas et al. | 405/45 |
| 6,034,329 | 3/2000 | Kawamura | 138/162 |
| 6,078,009 | 6/2000 | Kawamura | 138/162 |

*Primary Examiner*—James Hook
*Attorney, Agent, or Firm*—Pennie & Edmonds LLP

[57] ABSTRACT

The invention relates to a corrugated pipe which, in accordance with the invention includes an engagement structure formed perpendicular to the longitudinal extent of the corrugated pipe, whereby the engagement structure includes a portion dimensioned in circumferential direction of the corrugated pipe which is further radially spaced from the inner diameter of the pipe.

10 Claims, 4 Drawing Sheets

6,164,338

CORRUGATED PIPE WITH FOOT

FIELD OF THE INVENTION

The invention relates to corrugated pipes which can be attached to any desired object by way of a fastening device. The invention further relates in particular to a corrugated pipe fastening arrangement with a corrugated pipe according to the invention and a fastening device.

BACKGROUND OF THE INVENTION

Different types of corrugated pipes are known in the art. They are affixed depending on their application to certain objects for the receiving of, for example, electrical conduits, for example, in the engine compartment of a vehicle, in a cable duct, or the like. Various techniques are known in this respect, for example, special holding clamps, mounts with clamping jaws, and the like for the fastening of the corrugated pipes on selected objects.

It is, however, often problematic to find a suitable fastener for the corrugated pipes. Thus, even today, cable ties are predominantly used for the fastening of corrugated pipes. This leads, among other things, to vibrations which are undesired, especially in the engine compartment of a motor vehicle, since they also increase the noise level in the passenger compartment.

SUMMARY OF THE INVENTION

It is an object of the present invention to provide a corrugated pipe or a corrugated pipe fastening arrangement with integrated possibility of fastening.

This object is achieved by a corrugated pipe or a corrugated pipe fastening arrangement according to the present invention.

Practical embodiments of the corrugated pipe fastening arrangement in accordance with the invention or the corrugated pipe in accordance with the invention are apparent from the dependent claims.

The advantages to be achieved in accordance with the invention are based on providing a corrugated pipe which includes an engagement structure perpendicular to the longitudinal extent of the corrugated pipe itself. In accordance with the invention, the engagement structure thereby includes in circumferential direction of the corrugated pipe a larger sized section, which is radially spaced further away from the inner diameter of the pipe. In this manner, various different structures for corrugated pipes can be provided which allow a gripping, for example, by snapping in or sliding on. As an example for such structures can be used, for example, shapes which are in cross section of the corrugated pipe mushroom shaped, hook shaped, any type of recessed webs or the like. Especially advantageous is thereby a mushroom shape, or an engagement structure which approaches a mushroom shape, since it can be produced in a corrugator in the same process step as the corrugated pipe. Other shapes can also be advantageous for the engagement structure, but have the inherent problem that a separation plane of the half molds of a corrugator, irrespective of how it is oriented relative to the corrugated pipe with the features according to the invention, cannot be oriented relative to the corrugated pipe in such a way that a problem free separation of a corrugated pipe with features according to the invention from the opening half molds or half ingot molds would be easily possible during manufacture. Such structures which cannot be manufactured in a corrugator integrally with the corrugated pipe must be subsequently molded into the pipe, attached thereto or, otherwise, provided in or on the pipe.

Of course, the corrugated pipe is preferably associated with a fastening device which is complementary shaped to the engagement structure in order to fixedly interlock with the engagement structure.

The corrugated pipe in accordance with the invention and the fastening device together form a corrugated pipe fastening arrangement which is also encompassed by the present invention.

The engagement structure or engagement structures are preferably provided only on or in the corrugation crests of the corrugated pipe. It is thereby especially preferred that the material otherwise used during the corrugation process for the forming of the corrugation is suitably pulled or pushed (by pressure or vacuum) into engagement structure-shaped recesses in the half molds of the corrugator in order to form the engagement structures. The engagement structures on one or more of the corrugation crests can thereby have about the height of a corrugation crest itself.

As already mentioned, it can be preferred to provide the engagement structure or the engagement structures not along the whole length of the corrugated pipe with the features according to the invention but only over a limited amount of preferably adjacent corrugation crests. It would also be possible to provide every second corrugation crest with an engagement structure, or every third, fourth corrugation, etc.

If fastening of the corrugated pipe at any possible location is desired, the corrugated pipe of course has to be provided over its whole length with the engagement structure.

The engagement structures can of course also be provided outside the corrugations of the corrugation crests during the corrugation process. The engagement structures would thereby, however, extend beyond the corrugations of the corrugated pipe and, thereby, beyond the diameter of the corrugated pipe, whereby the dimensions of the corrugated pipe would be enlarged. Furthermore, more plastics material would be required in order to manufacture corresponding corrugated pipes with features according to the invention.

The fastening device clamps the engagement structure or engagement structures for the achievement of a fastening grip on the engagement structure. Of course, the fastening device can also interlock in the engagement structure, if the latter is constructed accordingly. A partial gripping combined with a partial interlocking is also easily achievable, depending on the construction of the engagement structure.

Various tests, however, have shown that a mushroom shaped or T-shaped construction of the engagement structure is especially advantageous, since it is mechanically stable and, because of its symmetry, can be especially easily gripped by a correspondingly shaped fastening device.

The fastening device is advantageously snapped onto or pushed onto the engagement structure. The fastening device, as mentioned above, must thereby be accordingly constructed.

In order to prevent the fastening device sliding off the corrugated pipe with features according to the invention, a stop arrangement is preferably provided at the end of one engagement structure, which preferably extends over several corrugation crests, in order to limit the movability of the fastening arrangement. Such a stop arrangement can also be an adjacent corrugation crest, if the engagement structure does not extend beyond the height of the corrugation crests in radial direction. The engagement structure can also be provided during the corrugation process in only one half of the corrugation crest, so that the other half of the corrugation crest in which no engagement structure is provided functions as stop arrangement. The movement of the fastening arrangement relative to the engagement structure can thereby be advantageously limited.

In order to prevent a slipping of the corrugated pipe relative to the fastening device, interlocking means are preferably provided on the engagement structure and/or on the fastening device in order to interlock the engagement structure with the fastening device.

The fastening device preferably includes a projection, for example, an interlocking projection, for the fixing of the fastening arrangement to an object. Of course. threaded projections or locking bolt projections or any other projection can be provided, as long as it can provide a fastening engagement with the object to which the corrugated pipe with the features according to the invention is to be fastened.

The fastening device of the corrugated pipe fastening arrangement can be provided with supporting surfaces which provide for preferably biased support on an object for the dampening of vibrations or the like. The supporting surfaces thereby preferably cooperate with the projection for the fastening of the fastening device on an object. For example, an interlocking section of the fastening device is provided below a plane spanned by two supporting surfaces so that the supporting surfaces are deflected during the interlocking of the fastening arrangement to create a counter pressure which further leads to the effect that, for example, tong-like gripping regions of the fastening arrangement are supported and stiffened therewith so that the connection between the fastening arrangement and the engagement structure is mechanically further stabilized.

BRIEF DESCRIPTION OF THE DRAWINGS

The present invention will be further described in the following by way of two embodiments. Further features according to the invention, further objects and advantages of the embodiment in accordance with the invention are thereby described with reference to the attached Figures, whereby in the illustrations

DETAILED DESCRIPTION OF THE PREFERRED EMBODIMENT

Corresponding parts or parts of corresponding function are referred to in the Figures by the same or similar reference numbers (for example, 12, 12A, 12B) so that a repeated discussion of the same parts or at least functionally equivalent parts is obviated.

Figure 1:
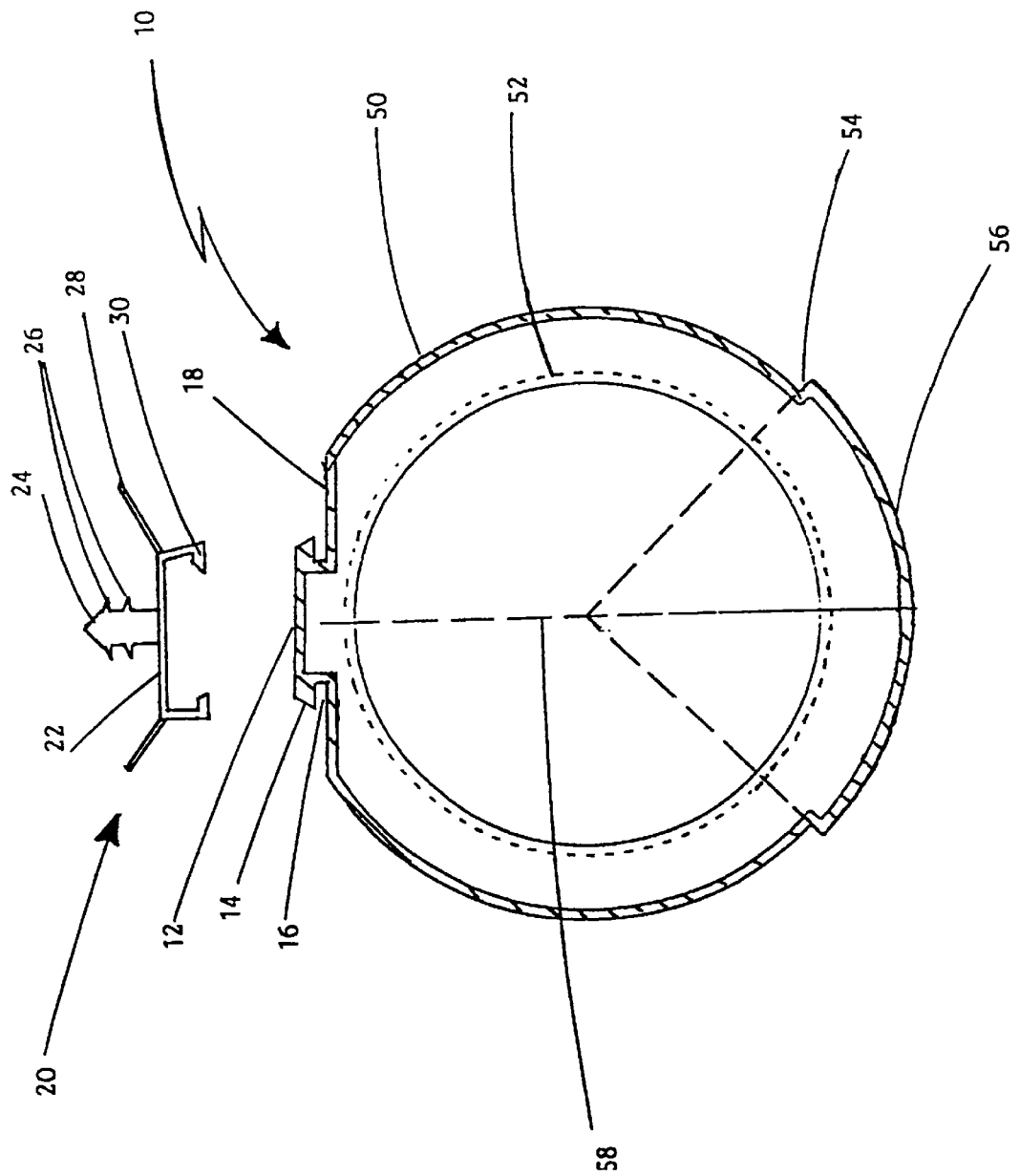
FIG. 1 shows a preferred embodiment in cross-sectional illustration.

In FIG. 1, a pipe with the features according to the invention is referred to in general by reference numeral 10. A fastening device is identified by the reference number 20.

The corrugated pipe 10 is principally of any desired shape. It can be provided with a longitudinal slit; it can be provided with arrangements for the closing of the longitudinal slit; it can be oval or rectangular. The corrugated pipe 10 in the illustrated embodiments includes a rotation lock 54, 56 for engagement with, for example, pipe sections for the closure of a possibly slitted pipe. However, as mentioned, the structure of the corrugated pipe can be arbitrarily selected and the present description deals only with the construction of a corrugated pipe with respect to a foot 12 or an engagement structure 12. The foot or engagement structure 12 can also itself function as rotation lock.

The corrugated pipe 10 with the mushroom-shaped or T-shaped foot 12 is constructed symmetrical to axis 58. This axis 58 is preferably located within the separation plane of the half molds of the corrugator so that it is possible to remove the foot 12 from the corrugator half molds during the separation thereof.

The foot or engagement structure 12 is formed between a corrugation trough 52 of a corrugation and a corrugation crest 50 of a corrugation of the corrugated pipe 10.

The foot 12 has lateral extensions 14 which are located above abutment shoulders 18 and together therewith define engagement regions 16 therebetween.

The fastening arrangement 20 associated with the foot 12 includes two claw-shaped gripping regions 30 which can be brought into engagement with the foot 12 and which in their operational position are positioned in particular in the engagement region 16. The connecting region which is adjacent the claw-shaped gripping regions 30, after positioning of the fastening arrangement 20 on the foot 12, can be positioned directly on the surface of the foot 12 or positioned spaced apart therefrom in order not to stiffen the pipe too much in the engagement region of the fastening arrangement with the foot or the engagement arrangement 12 during bending of the pipe, in order to permit easier bending of the corrugated pipe 10.

Supporting surfaces 28 which are connected with the connecting region 22 are integral therewith. The supporting surfaces 28 among other things function as levers in order to mechanically stabilize the claw-shaped gripping regions or claws 30 in their functional position on the foot 12. Furthermore, the supporting surfaces 28 provide for the achievement of a gap-free engagement with an uneven surface of an object and the absorption or dampening of vibrations or the like.

The connecting region 22 also includes a fastener projection 24 which is here shown as a snap-in projection. To this end, interlocking noses or interlocking regions 26 are provided on the projection 24. For example, when the fastening arrangement 20 is inserted into an opening within the engine compartment of a motor vehicle, the interlocking noses 26 can interlock with the edges of the opening and the supporting surfaces 28 support the fastening arrangement 20 on the surface of the motor vehicle.

Figure 2:
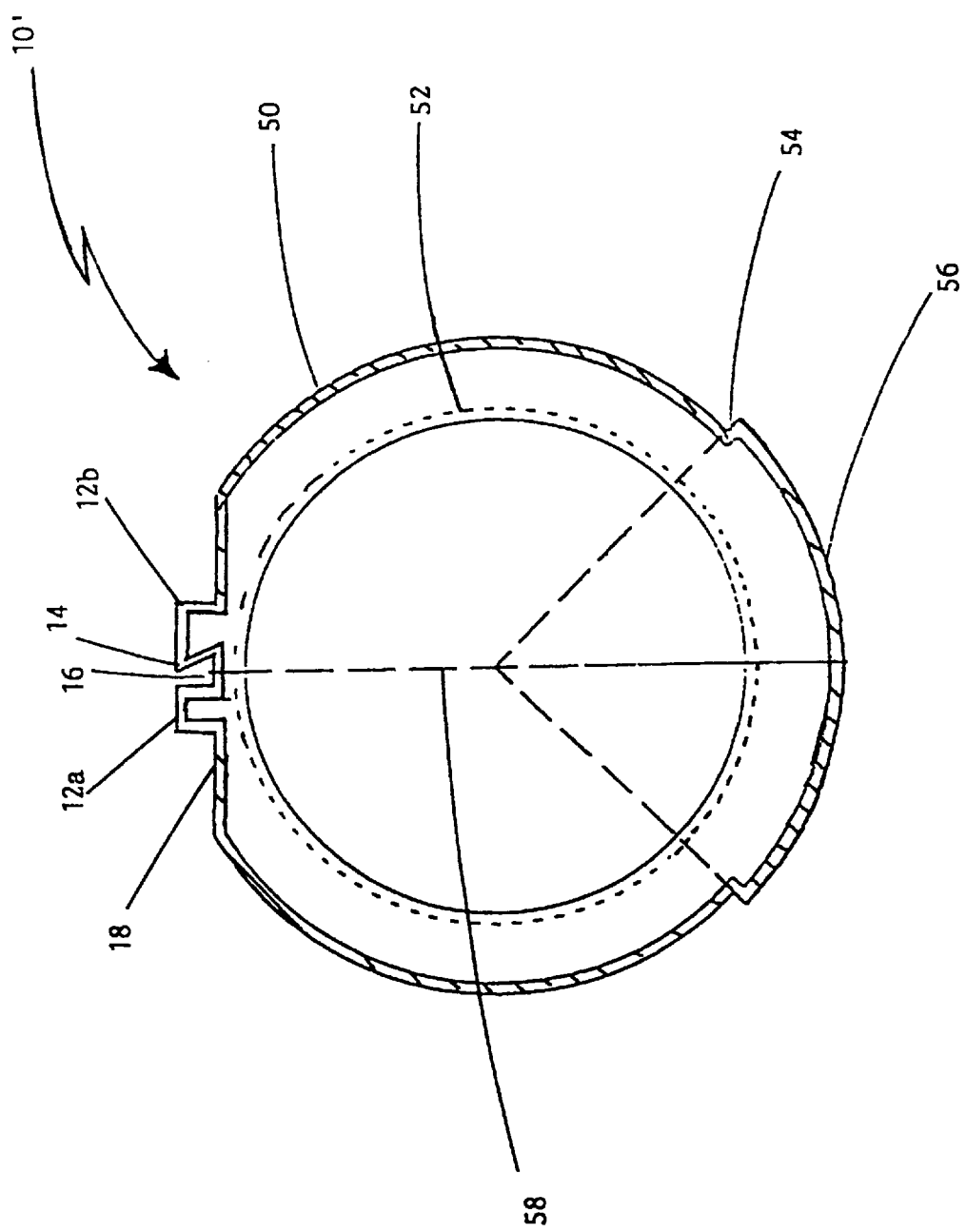
FIG. 2 is a further embodiment with features according to the invention also shown in cross section.

FIG. 2 shows a further embodiment of a corrugated pipe with features according to the invention which is referred to by the reference number 10'.

With respect to the corrugated pipe 10', it must be noted that regarding its sectional plane 58, it is not as advantageous as the corrugated pipe according to FIG. 1. As is apparent, in this embodiment of a corrugated pipe 10', the engagement structure 12A, 12B is not constructed in such a way that it would be separable from the half molds of a corrugator during the opening thereof. Therefore, it would here be necessary to initially partially manufacture the foot 12A, 12B or the engagement structure together with the pipe, without providing the engagement region 16. The engagement region 16 could then be later molded into the engagement structure, whereby the pipe material would then have to be heated again at least in the region of the engagement structure or foot 12A, 12B. Of course, the whole engagement structure here illustrated could also be subsequently provided on the outer circumference of a pipe. These processes are however relatively expensive so that compared to the embodiment of FIG. 2, the embodiment of FIG. 1 is definitely preferred.

In the embodiment of a corrugated pipe 10' according to FIG. 2, the engagement structure 12A in combination with the lateral extension or the overhang 14 of the engagement structure portion 12B takes on the roll of the lateral extensions 14 of the engagement structure or foot 12 according to FIG. 1.

A corresponding fastening device (not illustrated) which, for example, rests on the surfaces of the engagement structure 12A, 12B and engages the engagement region 16 with a fastener protrusion (not illustrated), would accordingly have to be provided in order to fasten the embodiment 10' according to FIG. 2 in the manner in which the corrugated pipe according to FIG. 1 is fastened.

Figure 3:
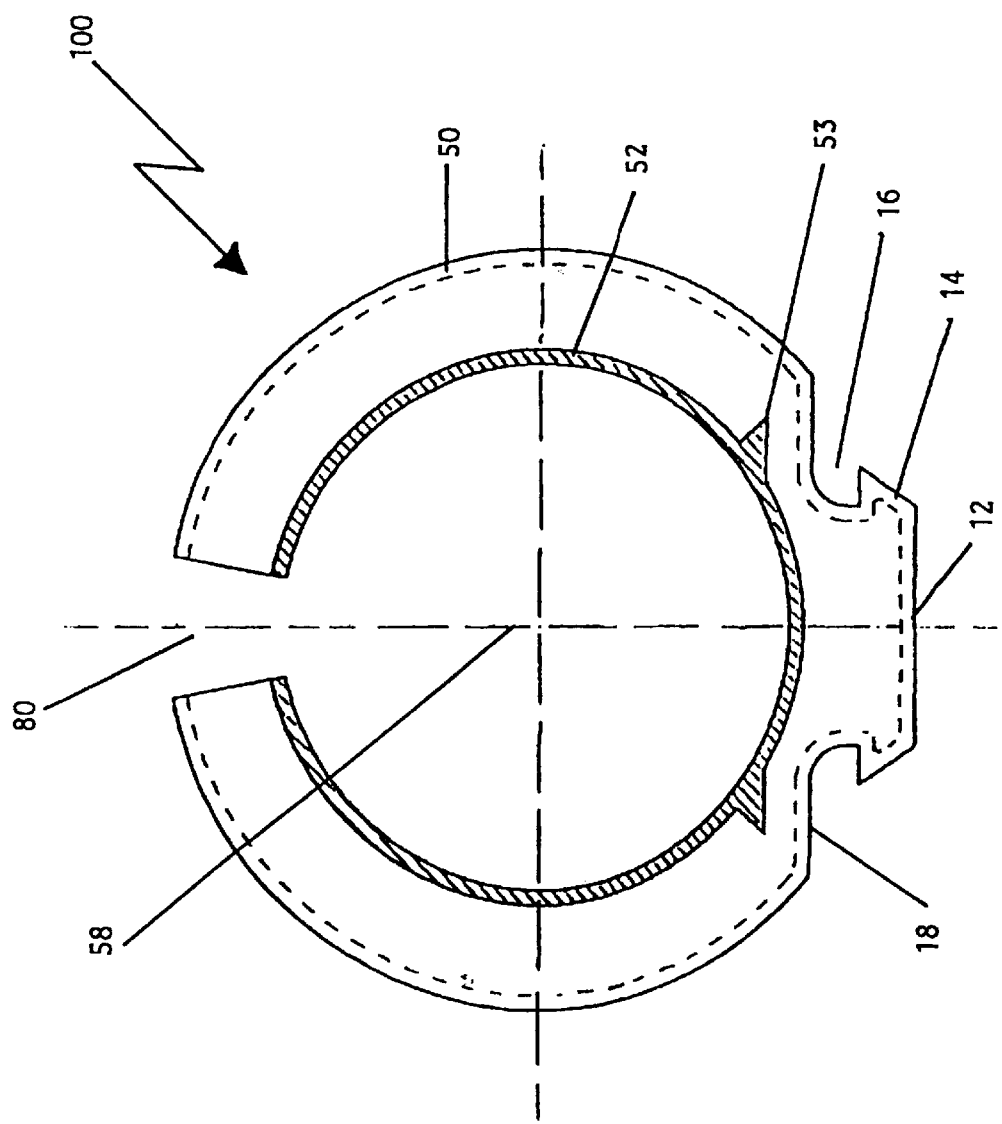
FIG. 3 is a further embodiment in cross-sectional illustration.
Figure 3A:
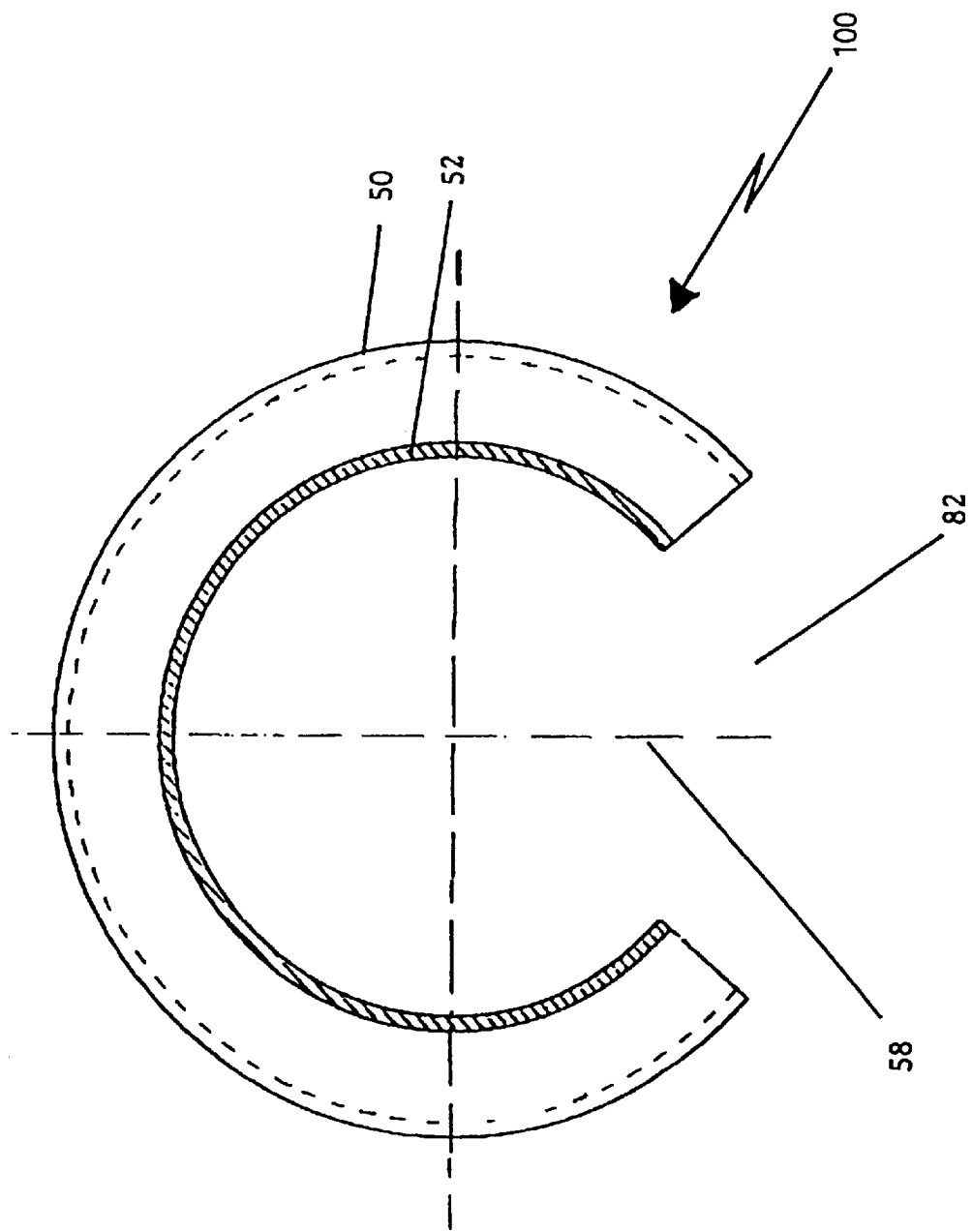
FIG. 3A is a cross-sectional illustration of an outer pipe to the corrugated pipe according to FIG. 3.

FIG. 3 shows a cross-sectional illustration of a further corrugated pipe 100 with foot which is designed to be surrounded during use by the corrugated pipe 100 according to FIG. 3A.

The corrugated pipe 100 with foot 12 according to FIG. 3 is principally constructed according to the embodiment of FIG. 1 as far as the foot or engagement structure 12 is concerned. However, the cross-sectional illustration here further shows rotation locks 53 which can correspond in principle to the shoulders 18 also apparent from FIG. 1. This rotation lock 63 on the inner circumference of the corrugated pipe 100 results from the manufacturing process wherein material is forced or sucked by pressure or vacuum into mold halves, while the mold halves form a closed mold.

The embodiment 100 according to FIG. 3 has a longitudinal slit 80 for insertion, for example, of cables or the like into the longitudinal slit. The slit can be wider or even so small that the laterally adjacent corrugated regions are directly adjacent to one another.

As is apparent, the foot 12 according to FIG. 3 is constructed higher and can therefore, in addition to its holding function, also function as rotation lock for the outer corrugated pipe according to FIG. 3A. The outer corrugated pipe is principally constructed as a conventional corrugated pipe, the corrugations of which, i.e., its corrugation troughs 52 and corrugation crests 50, are constructed corresponding to the corrugations 50, 52 of the pipe 100 according to FIG. 3 so that they can interlock.

The corrugated pipe 100 according to FIG. 3A has a relatively wide slit 82 through which the corrugated pipe 100 according to FIG. 3 can be inserted. In this manner, the corrugated pipe according to FIG. 3 can be closed and the foot 12 of the corrugated pipe according to FIG. 3 can prevent that the corrugated pipe according to FIG. 3A rotates relative to the corrugated pipe according to FIG. 3 and possibly allows access to the slit 82.

In this manner, electrical conductors which are positioned in the corrugated pipe with foot according to FIG. 3 can be permanently protected by covering the slit 80 with the corrugated pipe according to FIG. 3A, whereby the foot 12, which in the installed condition is held in a fastening device 20 according to FIG. 1, can prevent a rotation of the outer corrugated pipe according to FIG. 3A relative to the inner corrugated pipe 100 with foot 12 according to FIG. 3.

It must be noted here that the foot can principally have any desired dimensions, whereby however the amount of material used during the manufacturing process is limited in reality so that the total outer surface of the corrugated pipe with foot should essentially correspond to the outer surface of the illustrated corrugated pipe according to FIG. 3. Otherwise, the wall thickness of the corrugated pipe could be too small so that the stability of the corrugated pipe is affected.

It must be further noted that the corrugated pipe according to FIG. 3A, which can also be considered a closure member, can be snapped in sections onto the corrugated pipe according to FIG. 3. Furthermore, it must be noted that an especially advantageous embodiment results when the shoulders 53 on the outer circumference of the corrugated pipe according to FIG. 3 function as rotation locks so that the foot does not need to function as the rotation lock for the closure element or the outer pipe according to FIG. 3A.

The rotation lock 53 generally can be provided in each corrugation trough or only in selected corrugation troughs, for example, in each second or third corrugation trough of the corrugated pipe 100 with foot 12 according to FIG. 3.

In order to avoid stiffening of the corrugated pipe according to FIG. 3 by the rotation lock, it is preferred to provide the rotation lock only over portions of the corrugated pipe rather than over the whole longitudinal extent thereof. The rotation locks 53 can connect neighbouring corrugation crests which, however, again results in stiffening of the corrugated pipe. It is preferred to provide the rotation locks 53 in the corrugation troughs or possibly on the corrugation crests as separate elements since the flexibility is then only slightly affected or not at all.

What is claimed is:

1. Corrugated pipe, comprising an engagement structure extending perpendicular to a longitudinal extent of the corrugated pipe, said engagement structure having a first section, which projects outward from a circumferential section of the corrugated pipe, and having a second section, which is radially further spaced from said circumferential direction than the first section such that the second section projects in circumferential direction relative to the first section.

2. Corrugated pipe fastening arrangement, comprising a corrugated pipe according to claim 1 and a fastening device, whereby the fastening device is constructed complementary to the engagement structure in order to enable fastening engagement with the engagement structure.

3. Corrugated pipe or corrugated pipe fastening arrangement according to one of claim 2, wherein the fastening device at least partly grips the engagement structure or at least partly engages therein and can be snapped onto or pushed onto the engagement structure.

4. Corrugated pipe or corrugated pipe fastening structure according to claim 2, wherein interlocking means are provided on the engagement structure and/or the fastening device to interlock them with one another, whereby the fastening device includes an interlocking projection, for the fastening of the fastening device to an object.

5. Corrugated pipe or corrugated pipe fastening structure according to claim 2, wherein the fastening arrangement includes supporting surfaces which provide for a biased supporting on an object to dampen vibrations.

6. Corrugated pipe or corrugated pipe fastening construction according to claim 1, wherein the engagement structure is provided only on or in the corrugation crests or corrugations of the corrugated pipe, whereby a limited number of corrugation crests are provided with the engagement structure.

7. Corrugated pipe or corrugated pipe arrangement according to claim 1, wherein the corrugations themselves are provided with the engagement structure, whereby these extend from the corrugation trough to the corrugation crest.

8. Corrugated pipe or corrugated pipe fastening structure according to claim 1, wherein a stop arrangement is positioned at an end region of one engagement structure extending over several corrugation crests.

9. Corrugated pipe or corrugated pipe fastening structure according to one of claim 1, wherein the engagement structure of the corrugated pipe is located in a longitudinal slit of a further corrugated pipe surrounding the corrugated pipe in order to function as a rotation stop for the corrugated pipe relative to the longitudinally slitted corrugated pipe.

10. Corrugated pipe or corrugated pipe arrangement according to claim 1, wherein it includes projections positioned in the corrugation troughs or on the corrugation crests, whereby the projections are free standing or continuously constructed.

* * * * *